Patented Feb. 26, 1924.

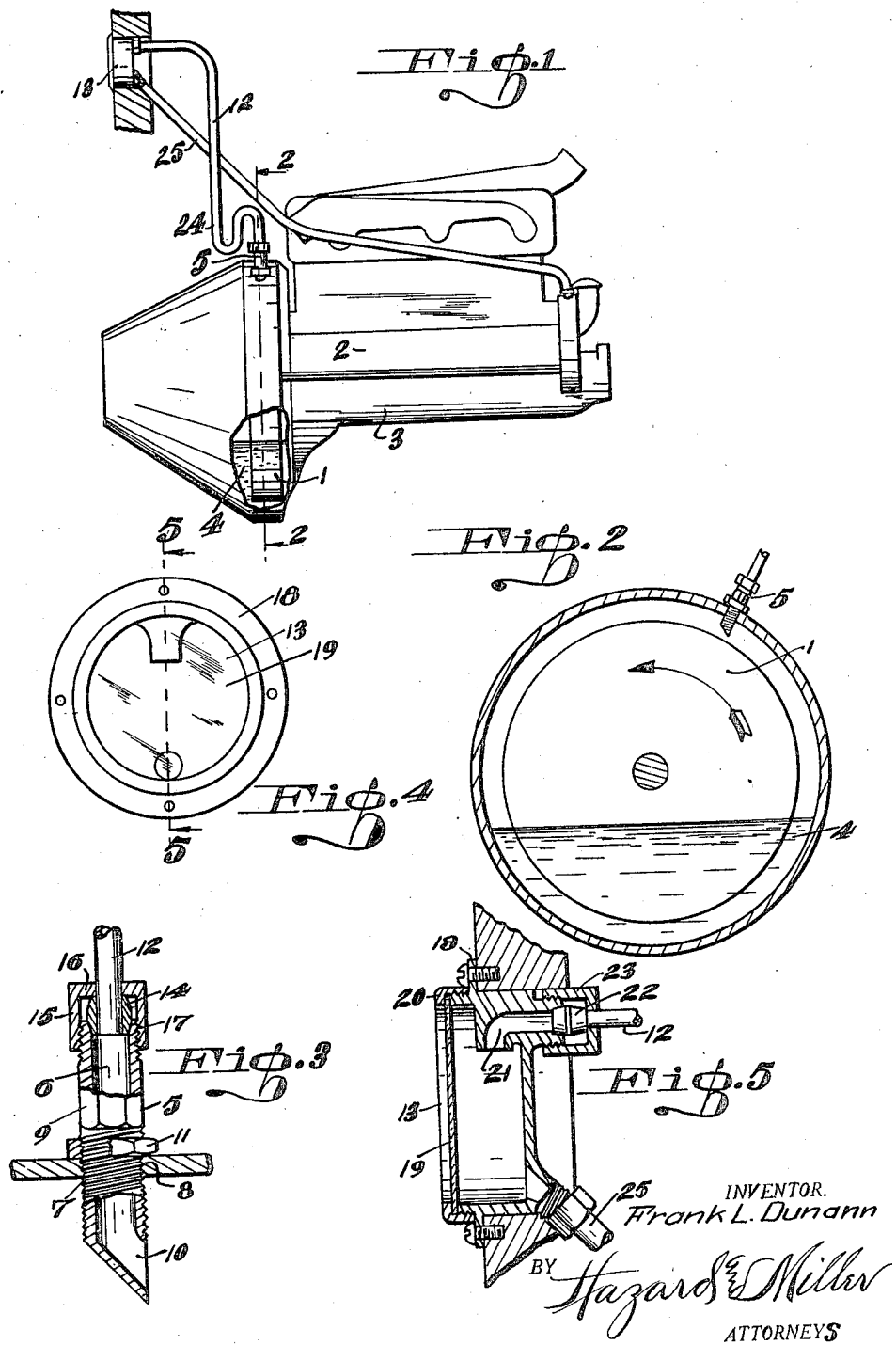

1,484,935

UNITED STATES PATENT OFFICE.

FRANK L. DUNANN, OF LOMPOC, CALIFORNIA.

CENTRIFUGAL-FORCE SIGHT FEED.

Application filed April 20, 1920. Serial No. 375,375.

*To all whom it may concern:*

Be it known that I, FRANK L. DUNANN, a citizen of the United States, residing at Lompoc, in the county of Santa Barbara and State of California, have invented new and useful Improvements in Centrifugal-Force Sight Feeds, of which the following is a specification.

This invention is a sight feed for visually indicating the circulation of a lubricating medium particularly the circulation of a lubricant in the crank casing of an internal combustion engine, and the invention is specifically applicable to an engine in which the lubricant is circulated by centrifugal action.

It is the object of the invention to provide a simple construction which will afford means of the greatest efficiency for forcing the lubricant through the sight feed in order that the latter shall at all times accurately indicate the condition of the lubricant circulation.

Further objects of the invention will be understood from the following description of the accompanying drawings in which;

Figure 1 is a side elevation of the invention applied to an internal combustion engine.

Fig. 2 is a transverse section on the line 2—2 of Fig. 1.

Fig. 3 is an enlarged longitudinal section through the plug which is inserted in the crank casing of the engine.

Fig. 4 is a front elevation of the visual indicator of the sight feed.

Fig. 5 is a vertical section on the line 5—5 of Fig. 4.

The invention is shown applied to an internal combustion engine having the fly wheel 1, the crank casing of the engine being made in upper and lower sections 2 and 3 and inclosing the fly wheel of the engine as well as the crank shaft thereof. A lubricating medium shown at 4 is supplied to the crank casing and is circulated therein in the usual manner by the rotation of the fly wheel, the latter being provided with the usual fins for elevating the lubricant and causing centrifugal motion thereof within the crank casing.

The improved sight feed comprises a conduit extending from the crank casing adjacent the fly wheel 1 to a visual indicator mounted upon either the dash board or instrument board of an automobile when the internal combustion engine is used as an automobile engine or tractor engine, and a return conduit from the visual indicator to the end of the crank casing of the engine opposite the fly wheel end thereof. The conduit, leading from the crank casing adjacent the fly wheel, is so arranged that the centrifugally actuated lubricant within the casing will be forced into the conduit and thence through the visual indicator and back to the opposite end of the crank casing.

For this purpose the connection between the conduit and the crank casing may comprise a hollow plug 5 having an aperture 6 extending therethrough. The outer surface of this plug is provided with a threaded portion 7 so that the plug may be supported in a suitable threaded opening 8 provided in the crank casing, the surface of the plug above the threaded portion 7 being, preferably, formed as a nut 9 for readily threading the plug into the casing of the engine. A jam nut 11 may then be threaded upon the threaded portion 7 of the plug for holding the latter in the desired position.

The plug is, preferably, positioned in the engine casing in the plane of the fly wheel 1 and to the side of the vertical axial plane of the fly wheel, as clearly shown in Fig. 2, where the plug will be in the circulation of the lubricant during elevation thereof. The inner end portion of the aperture 6 extending through the plug is, preferably, angularly arranged with respect to the main aperture, as shown at 10 so that this end portion of the aperture extends substantially in the direction of flow of the centrifugally circulating lubricant within the crank casing. By this arrangement it will be seen that the full force of the circulating lubricant is received in the end portion 10 of the aperture through the plug 5 for positively forcing said lubricant through the plug.

A conduit 12 extends from the plug 5 to the visual indicator 13, the connection between the end of the plug and the conduit, preferably, comprising a collar 14 in which the end of the conduit is received and which is arranged to be seated in the end of the aperture 6 extending through the plug, and a retaining collar 15 having a flanged end 16 fitting over the end of collar 14 and adapted for threaded engagement, as shown at 17, with the end of the plug 5.

The visual indicator 13 may be a usual casing provided with a retaining flange 18 for mounting the casing upon the dash board and having the front thereof closed by a glass 19 held in position by a usual retaining ring 20.

A usual inlet port 21 is provided in the upper portion of the casing of the indicator and the conduit 12 is, preferably, connected to this inlet port by extending the end of the conduit through a collar 22 arranged to seat against the end of the inlet port, a collar 23 having threaded engagement with the inlet port being provided over the end of the collar 22. The conduit 12 is, preferably, provided with a reversely bent portion adjacent the plug 5 forming a trap 24 for the lubricant forced upwardly to the visual indicator. A return conduit 25 is provided between the lower portion of the casing of the visual indicator and the forward portion of the crank casing of the engine. The discharge port from the casing of the indicator to this conduit, preferably, slopes at an appreciable angle downwardly from the casing of the indicator, and the end of conduit 25 connected to this discharge port is, preferably, similarly downwardly inclined. By this arrangement when the engine stops and the lubricant is no longer pumped through the visual indicator all of the lubricant within the casing of the indicator will be drained therefrom through the discharge port.

The ends of the conduit 25 are, preferably, connected to the casing of the indicator and to the crank casing of the engine by connections similar to the connections provided at the respective ends of the conduit 12, as previously described.

Various changes may be made without departing from the spirit of the invention as claimed.

What is claimed is:

1. The combination with an engine having a crank casing and a rotatable member therein for circulating a lubricating medium, of a conduit extending from said crank casing adjacent said rotatable member, a sight glass in said conduit, a trap for said lubricant in said conduit between said sight glass and said rotatable member, said conduit leading to the opposite end of said casing.

2. The combination with an engine having a crank casing and a rotatable member therein for circulating a lubricating medium, of a conduit extending from said crank casing adjacent said rotatable member, a sight glass in said conduit, said conduit having a reversely bent portion forming a trap for said lubricant between said sight glass and said rotatable member, said conduit leading to the opposite end of said casing.

In testimony whereof I have signed my name to this specification.

FRANK L. DUNANN.